US011432185B2

(12) United States Patent
Barton et al.

(10) Patent No.: US 11,432,185 B2
(45) Date of Patent: Aug. 30, 2022

(54) DELIVERING INTENT-BASED APPLICATION POLICY ON WIFI NETWORKS

(71) Applicant: Cisco Technology, Inc., San Jose, CA (US)

(72) Inventors: Robert E. Barton, Richmond (CA); Jerome Henry, Pittsboro, NC (US); Akram I. Sheriff, San Jose, CA (US); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/077,865

(22) Filed: Oct. 22, 2020

(65) Prior Publication Data

US 2022/0132365 A1    Apr. 28, 2022

(51) Int. Cl.
*H04W 28/02* (2009.01)
*H04L 1/00* (2006.01)

(52) U.S. Cl.
CPC ....... *H04W 28/0289* (2013.01); *H04L 1/0003* (2013.01); *H04W 28/0278* (2013.01); *H04W 28/0284* (2013.01)

(58) Field of Classification Search
CPC ......... H04W 28/0289; H04W 28/0278; H04W 28/0284; H04L 1/0003
See application file for complete search history.

(56) References Cited

U.S. PATENT DOCUMENTS

| | | | |
|---|---|---|---|
| 9,474,054 B1* | 10/2016 | Pawar | H04W 72/0413 |
| 2017/0290026 A1* | 10/2017 | Li | H04W 72/04 |
| 2018/0020372 A1* | 1/2018 | Viger | H04W 28/0278 |
| 2018/0027453 A1* | 1/2018 | Viger | H04W 72/1289 370/336 |
| 2018/0183548 A1* | 6/2018 | Gan | H04L 1/1621 |
| 2018/0213379 A1* | 7/2018 | Xiong | H04W 4/70 |
| 2019/0223048 A1* | 7/2019 | Xu | H04W 72/1284 |
| 2021/0204100 A1* | 7/2021 | Lin | H04W 72/1263 |

OTHER PUBLICATIONS

Szilagyi Szabolcs and Almasi Bela, "A Review of Congestion Management Algorithms on Cirsco Routers," Journal of Computer Science and Control Systems, vol. 5, No. 1, May 2012, 6 pages.

* cited by examiner

*Primary Examiner* — Ajay Cattungal
(74) *Attorney, Agent, or Firm* — Patterson + Sheridan, LLP (57) ABSTRACT

Techniques and apparatus for managing congestion in a wireless network are provided. One technique includes receiving one or more buffer status reports (BSRs) from one or more client stations. Each BSR indicates an amount of traffic in a transmit queue of the client station. An allocation of resource units (RUs) for the one or more client stations is determined, based on at least a type of traffic in each transmit queue of the one or more client stations, upon a determination that there is congestion on an uplink wireless channel shared by the one or more client stations. A frame that includes an indication of the allocation of RUs for the one or more client stations is generated. The frame is transmitted to the one or more client stations.

20 Claims, 7 Drawing Sheets

DELIVERING INTENT-BASED APPLICATION POLICY ON WIFI NETWORKS

TECHNICAL FIELD

Embodiments presented in this disclosure generally relate to wireless transmission management. More specifically, embodiments disclosed herein relate to techniques for managing congestion in wireless networks.

BACKGROUND

Wireless Access Points (APs) operating on the same spectrum reserve blocks of time and spectrum to communicate with user devices so that communications do not overlap and interfere with one another. These blocks of time and spectrum are generally referred to as resource units (RUs). A wireless communication network can use a medium access control protocol, such as Enhanced Distributed Channel Access (EDCA), etc., to control access to a shared wireless channel, e.g., via the allocation of RUs.

The medium access control protocol can provision different quality of service (QoS) treatment for different types of traffic or access categories (ACs). EDCA, for example, can provision different QoS treatment for four different ACs, including voice, video, best effort, and background. EDCA can achieve different QoS treatment by assigning different timer intervals (e.g., Arbitration Interframe Space (AIFS)) and back-off timers (e.g., Contention window (CW) timers) to different ACs. Additionally, EDCA can use different transmission opportunity (TXOP) values per AC to promote better QoS for critical classes, e.g., voice.

One issue with these medium access control protocols is that some wireless communication networks, such as the Institute of Electrical and Electronics Engineers (IEEE) 802.11ax (also referred to as WiFi 6) may not support these protocols in combination with other multiple-access technologies, such as orthogonal frequency division multiple access (OFDMA). For example, in wireless networks that support OFDMA, wireless stations may be able to transmit simultaneously, regardless of the type of traffic queued at each wireless station. However, when there is congestion on the shared media, the simultaneous transmission can impact the performance of the communication network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a computer-implemented method performed by an apparatus. The computer-implemented method includes receiving, from one or more client stations, one or more buffer status reports (BSRs), each BSR from one of the client stations indicating at least an amount of traffic in a transmit queue of the client station. The computer-implemented method also includes, upon determining, based on the one or more BSRs, that there is congestion on an uplink wireless channel shared by the one or more client stations, determining an allocation of resource units (RUs) for the one or more client stations, based on at least a type of traffic in each transmit queue of the one or more client stations. The computer-implemented method further includes generating a first frame comprising an indication of the allocation of RUs for the one or more client stations, and transmitting the first frame to the one or more client stations.

One embodiment presented in this disclosure is an access point (AP). The AP generally includes a processor and a memory. The memory contains a program that, when executed by the processor performs an operation. The operation includes receiving, from one or more client stations, one or more buffer status reports (BSRs), each BSR from one of the client stations indicating at least an amount of traffic in a transmit queue of the client station. The operation also includes, upon determining, based on the one or more BSRs, that there is congestion on an uplink wireless channel shared by the one or more client stations, determining an allocation of resource units (RUs) for the one or more client stations, based on at least a type of traffic in each transmit queue of the one or more client stations. The operation further includes generating a first frame comprising an indication of the allocation of RUs for the one or more client stations, and transmitting the first frame to the one or more client stations.

Another embodiment presented in this disclosure is a non-transitory computer-readable storage medium. The non-transitory computer-readable storage medium has computer executable code stored thereon and is executable by one or more processors to perform an operation. The operation includes receiving, from one or more client stations, one or more buffer status reports (BSRs), each BSR from one of the client stations indicating at least an amount of traffic in a transmit queue of the client station. The operation also includes, upon determining, based on the one or more BSRs, that there is congestion on an uplink wireless channel shared by the one or more client stations, determining an allocation of resource units (RUs) for the one or more client stations, based on at least a type of traffic in each transmit queue of the one or more client stations. The operation further includes generating a first frame comprising an indication of the allocation of RUs for the one or more client stations, and transmitting the first frame to the one or more client stations.

Example Embodiments

Embodiments herein describe techniques for managing congestion in wireless networks that may not support conventional medium access control protocols, such as Enhanced Distributed Channel Access (EDCA), in combination with other multiple-access technologies. For example, 802.11ax and other networking standards may support multiple-access technologies, such as OFDMA and/or multi-user multiple-input multiple-output (MU-MIMO) that are capable of supporting communication with multiple users. In OFDMA, for example, multiple access is achieved by assigning different portions (or subsets) of spectrum to individual users. Due to the multiplexing of uplink OFDMA, client stations (STAs) may not have to contend for access to the shared medium (e.g., when sending traffic for a single AC. Rather, the client STAs can transmit simultaneously, regardless of the type of traffic queued at the STA. In other words, a client STA that has gained medium access for a given AC may not be able to send traffic belonging to another AC during the corresponding TXOP.

In some cases, these wireless networks are not able to efficiently handle (or manage) congestion that occurs in the network, e.g., when there is an insufficient amount of resources available to be allocated to client STAs. For example, while wireless networks, such as 802.11ax, enable an AP to allocate resource units (RUs) to a given client STA, based on an amount of uplink traffic (at the client STA) (e.g., indicated in a buffer status report (BSR)), when congestion occurs in the network, the AP may lack a QoS mechanism that can handle the prioritization of critical traffic (e.g., voice, video, etc.). As a reference example, this congestion scenario can occur when, for a 20 megahertz (MHz) channel, there are nine RUs available for uplink transmission and more than nine client STAs that want to transmit critical traffic (e.g., voice or video) at the same time. In this particular instance, at least one of the client STAs may not be able to transmit at that particular time.

To address this, embodiments provide techniques that enable a scheduling apparatus (e.g., AP) to employ an access category (AC)-based transmission scheduler (referred to herein as a "scheduling component") to manage upstream traffic from one or more client STAs, e.g., when upstream congestion on the wireless channel (or medium) is detected. As described below, the AP may detect whether there is upstream congestion, based on BSR(s) received from client STA(s). For example, the AP may continually compare the data from each BSR with (1) the overall RUs available in the channel and (2) the RUs allocated (or budgeted) to each AC (e.g., based on a predefined configuration).

When the AP determines there is congestion in the uplink direction (e.g., the amount of available RUs satisfies a predetermined condition), then the AP may trigger the scheduling component to employ one or more congestion management techniques described herein. In one embodiment, the scheduling component may be triggered to allocate RUs to one or more client STAs, based on at least one of the current status of the AC(s) at each of the client STA(s) and a priority of the ACs. For example, assuming there are client STAs that have a certain type of traffic (e.g.,) queued, the scheduling component may allocate RU(s) to the client STAs that have this type of traffic queued and ready to be sent. Additionally or alternatively, the scheduling component can configure at least one property of the allocated RU, based on the type of traffic. For example, assuming the type of traffic is voice traffic, the AP can optimize the TXOP of the transmission cycle for voice traffic.

As also described below, in some embodiments, in scenarios where there are a greater number of clients with traffic to transmit than RUs for a given wireless channel, the AP may allocate RUs to those client STAs, based on a pre-configured policy (e.g., first come first service basis), and wait-list any remaining client STAs until the next (or subsequent) transmission cycle. In one embodiment, the AP may continue to allocate RUs based on the pre-configured policy for client STAs that have a first type of traffic (e.g., voice), until the first type of traffic is completely serviced, before moving on to client STAs that have at least a second type of traffic (e.g., video, best effort, background). In some embodiments, the AP may use another pre-configured policy for the second type of traffic. For example, the AP may allocate RUs to client STAs that have lower priority traffic than voice, based on a pre-configured set of weights associated with each traffic class/access category.

As described below, the AP may generate and send a message (e.g., trigger frame) indicating to each client STA at least one of (1) which RUs are assigned to the client STA, (2) the TXOP value(s) associated with the RU(s), and (3) the preferred AC the client should use for the RUs. After sending the first message, the AP may generate and send another message (e.g., another trigger frame) triggering the client STA(s) to transmit uplink data, based on the respective allocations indicated in the first message. In one embodiment, each client STA may transmit simultaneously, e.g., using uplink OFDMA.

The AP may continually monitor uplink RU usage by clients and activate or deactivate the scheduling component, based on whether uplink congestion is detected. For example, when the AP determines there is no uplink congestion (e.g., the amount of available RUs satisfies a predetermined condition), then the AP may refrain from using the scheduling component to allocate RUs based on the congestion management techniques described herein, and traffic may be transmitted on a first-in, first-out (FIFO) basis.

By enabling an AP to selectively invoke an AC-based transmission scheduler to manage upstream traffic from client STA(s) when upstream congestion on a shared wireless channel is detected, embodiments can significantly improve the performance of the network, e.g., by allowing STAs with higher priority traffic in their transmit queues to get quicker access to the shared medium.

Note, the techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an AP or a client STA.

Figure 1:
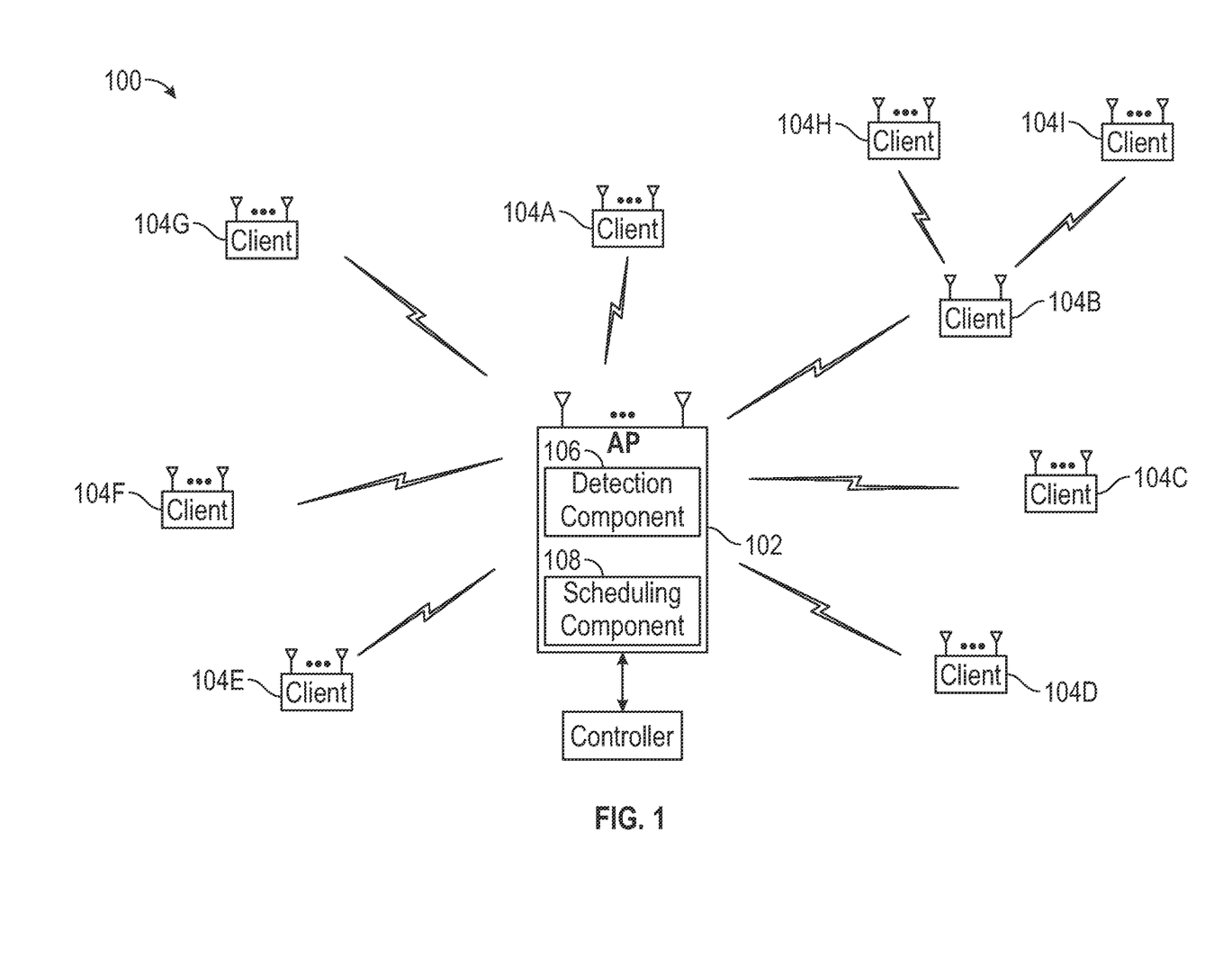
FIG. 1 illustrates an example wireless network, according to one embodiment.

FIG. 1 illustrates an example wireless network 100 in which one or more techniques described herein can be implemented, according to one embodiment. In one embodiment, the wireless network 100 employs OFDMA and/or MU-MIMO to provide for multiple access to a medium. In one particular embodiment, the wireless network 100 supports 802.11ax (or WiFi 6).

The wireless network 100 includes an AP 102 and client STAs 104 A-I. An AP is generally a fixed station that communicates with the client STAs and may also be referred to as a base station, wireless device, wireless node, or some other terminology. A client STA may be fixed or mobile and also may be referred to as a mobile STA, a client, a STA, a wireless device, a wireless node, user device, or some other terminology. Although one AP 102 is depicted, note that the wireless network 100 can include one or more APs 102.

In some embodiments, the client STA may be configured with multiple radio access technologies (RATs) available. Example client STAs include, but are not limited to smart phones, feature phones, tablet computers, laptop computers, desktop computers, Internet of Things (IoT) devices, and the like. The client STA may have network interfaces that include wired links and wireless links for a variety of RATs including, but not limited to: IEEE 802.11 or "WiFi" networks, BLUETOOTH® networks, "cellular" networks (including various generations and subtypes thereof, such as Long Term Evolution (LTE) and Fifth Generation New Radio (5G NR)), Citizens Broadband Radio Service (CBRS) networks, proprietary networks, etc. In some embodiments, the client STA includes one or more network interfaces for each supported RAT (e.g., two WiFi interfaces, one cellular interface, one Bluetooth interface, etc.).

The AP 102 may communicate with one or more client STAs 104A-I on the downlink and uplink. The downlink (e.g., forward link) is the communication link from the AP 102 to the client STAs 104, and the uplink (e.g., reverse link) is the communication link from the client STAs 104 to the AP 102. In some cases, a client STA (e.g., client STA 104B) may also communicate peer-to-peer with another client STA (e.g., client STA 104H, client STA 104I). A central controller 120 couples to and provides coordination and control for the AP(s) 102. For example, the central controller 120 may handle adjustments to radio frequency power, channels, authentication, and security for the AP(s). The central controller 120 may communicate with the AP(s) 102 via a backhaul. The AP(s) 102 may also communicate with one another, e.g., directly or indirectly via a wireless or wireline backhaul.

The AP 102 can assign (or allocate) RUs to each client STA 104. The RUs allocated to a given client STA 104 allow the SAT to send an amount of traffic over a time interval. As used herein, this time interval during which the STA is permitted to transmit is referred to as a TXOP. The AP 102 can coordinate multiple client STAs 104 (that may be allocated a different set of RUs) over the same TXOP. This enables multiple concurrent flows and allows for multiplexing of client STAs 104 in the same TXOP.

Here, the AP 102 includes a detection component 106 and a scheduling component 108, which are configured to implement one or more techniques described herein for managing (uplink) congestion in the wireless network 100. The detection component 106 and the scheduling component 108 may include software, hardware, or combinations thereof. Note that this particular embodiment assumes that the AP 102 is configured as a scheduling apparatus. However, in other embodiments, one of the client STAs 104 can be configured as a scheduling apparatus. In such embodiments, the client STA 104 that is configured as the scheduling apparatus can include a detection component 106 and a scheduling component 108 to implement one or more techniques described herein for managing congestion in the wireless network.

Figure 2:
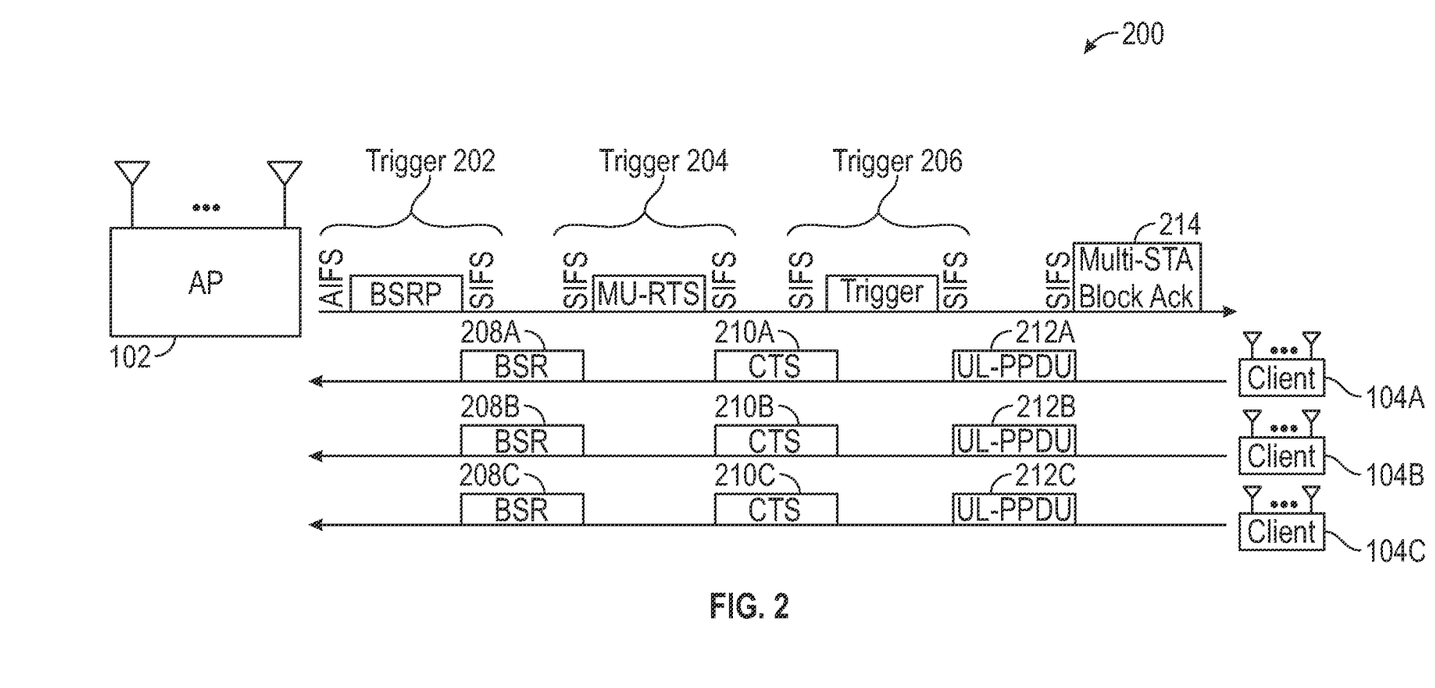
FIG. 2 illustrates an example workflow for managing congestion in a wireless network, according to one embodiment.

In one embodiment, the detection component 106 can determine whether there is upstream congestion at a given point in time, based on BSR(s) received from one or more client STAs 104. As shown in FIG. 2, for example, the AP 102 receives BSR 208A from client STA 104A, BSR 208B from client STA 104B, and BSR 208C from client STA 104C. In one embodiment, before the AP 102 assigns RUs to the client STA(s) 104, the AP 102 may communicate with the client STAs using a trigger frame 202. As shown in FIG. 2, for example, the trigger frame 202 is a buffer status report poll (BSRP). The BSRP may be a solicited message (e.g., the client STA(s) 104 have requested/triggered the AP 102 to send the BSRP) or an unsolicited message (e.g., the client STA(s) 104 have not requested/triggered the AP 102 to send the BSRP). The BSRP triggers each client STA 104 A-C to send a respective BSR 208 A-C to the AP 102.

Figure 3:
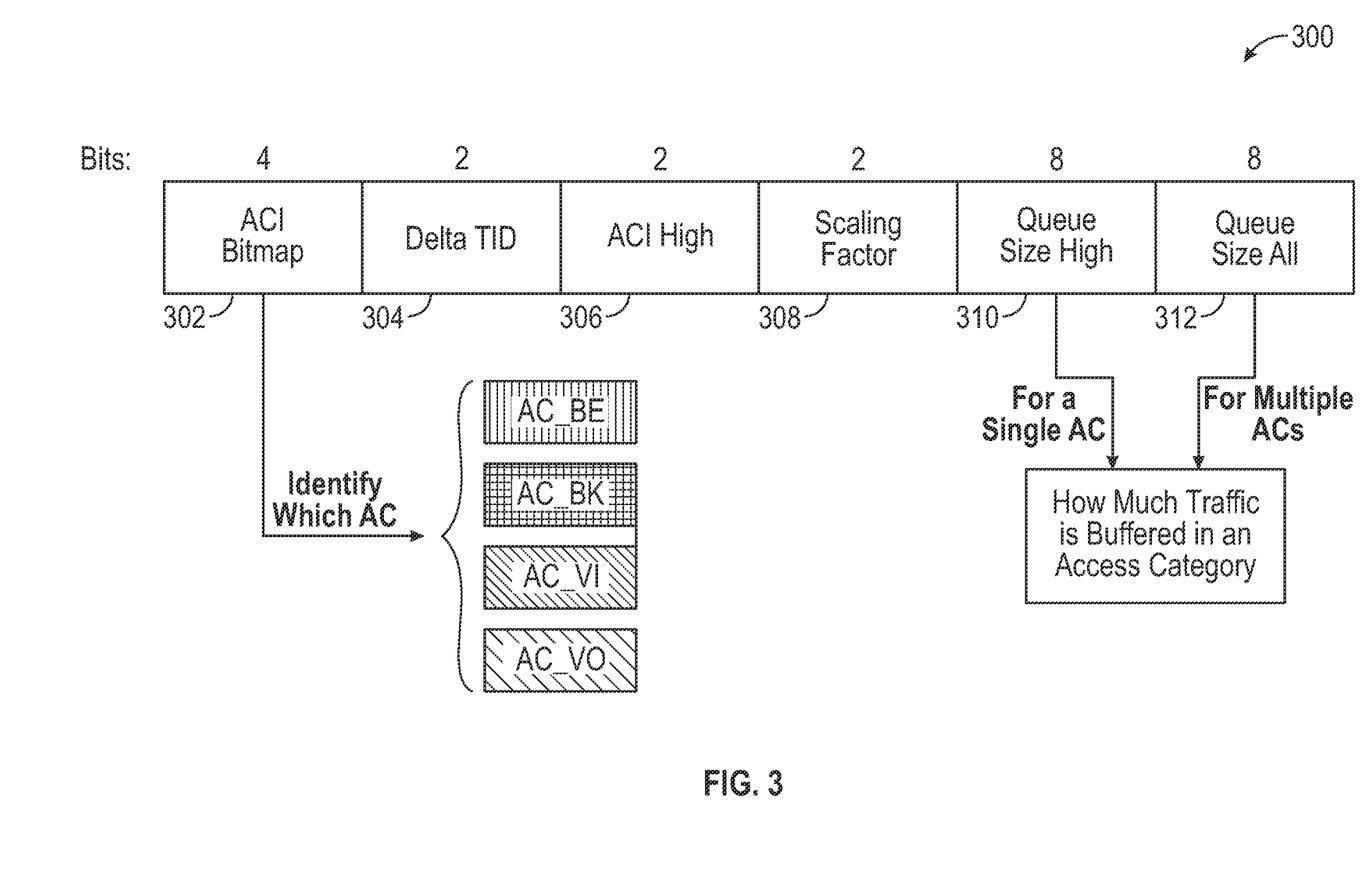
FIG. 3 illustrates an example frame format of a buffer status report.

The BSR 208 received from each client STA 104 can indicate at least the amount of traffic that the client STA has available (e.g., in its uplink queue) to send to the AP 102. FIG. 3 illustrates an example frame format 300 of a BSR (e.g., BSR 208). As shown, the frame format 300 includes an AC identifier (ACI) bitmap field 302, a delta traffic indicator (TID) field 304, ACI high field 306, scaling factor field 308, queue size high field 310, and queue size all field 312. The ACI bitmap field 302 identifies which AC the traffic in STA's buffer belongs to. For example, the ACI bitmap field 302 can indicate whether the traffic is voice (e.g., AC-VO), video (e.g., AC-VI), best effort (e.g., AC-BE), or background (e.g., AC-BK). In some cases, the ACI bitmap field 302 can include a bitmap indicating the ACs for which the buffer status is reported. In some cases, each bit of the ACI bitmap may be set to "1" (or "0") to indicate presence of buffer status information for a particular AC (e.g., voice).

The delta TID field 304 can indicate the number of TIDs for which the client STA is reporting buffer status information. The ACI high field 306 can indicate the ACI of the AC for which the buffer status information is indicated in the queue size high field 310. The scaling factor field 308 can indicate the size (or unit size) of the queue size field(s) 310 and 312. The queue size high field 310 can indicate the amount of buffered traffic (in units of the scaling factor) for the AC identified by the ACI high field 306. The queue size all field 312 can indicate (in units of the scaling factor) the amount of buffered traffic for all ACs identified by the ACI bitmap field 302.

Referring back to FIG. 2, the AP 102 can determine the total amount of traffic in each client STAs 104 A-C buffer, as well as the amount of data that is queued in each AC for each respective client STA 104 A-C, based on the BSRs 208 A-C. The AP can then allocate an appropriate amount of RUs to each client STA 104 A-C, based on the information.

In one embodiment, the AP 102 (via the detection component 106) can continually compare the data from each BSR 208 with (1) the overall RUs available in the wireless channel and (2) the RUs budgeted per AC in order to detect whether there is a congestion event in the uplink (or upstream) direction. The AP 102 may determine the RUs that are budgeted per AC based on a preconfigured application policy. In one embodiment, the AP 102 (via the detection component 106) can detect whether there is upstream congestion before it occurs on the wireless medium (e.g., as opposed to after the fact, based on high channel utilization values or transmission retries). Additionally, the AP 102 (via the detection component 106) can detect congestion on a per-AC basis (e.g., a user(s) may be consuming more video than has been provisioned on the wireless network 100).

The AP 102 (via the detection component 106) may determine there is congestion in the uplink direction when the amount of available RUs satisfies a predetermined condition. In one embodiment, the predetermined condition may be an amount of available RUs being greater than or equal to a predetermined threshold (e.g., overall RU budget). With reference to FIG. 2, for example, an uplink buffer status from at least one of the client STAs 104 A-C may indicate a traffic demand that cannot be met by the overall RU budget.

Additionally or alternatively, in one embodiment, the predetermined condition may be an amount of traffic associated with a particular AC that exceeds the RU capacity associated with that AC. For example, the collective traffic associated with a particular AC (e.g., AC-VO) (across one or more of the client STAs 104 A-C) may exceed the capacity allocated for that AC. Once the AP 102 detects a congestion event, the AP 102 may invoke (or trigger) the scheduling component 108 to intervene in the allocation of RUs to the client STAs 104A.

Note, however, that if the AP 102 (via the detection component 106) does not detect a congestion event (or determines congestion is no longer present), the AP 102 may refrain from invoking the scheduling component 108 (or may deactivate the scheduling component 108, if already activated). That is, the AP 102 can use the congestion event as a mechanism to active one or more queuing polices in the AP. When the AP 102 determines that congestion is not present, the AP 102 may allocate RUs to client STAs 104 A-C on a FIFO basis.

In one embodiment, the scheduling component 108 employs an AC-based transmission scheduler to manage the upstream traffic from the client STAs 104 A-C, e.g., in the event of a congestion event. For example, the scheduling component 108 can determine which client STAs 104 A-C will be allowed to transmit in the current time interval, the RUs that the client STAs 104 A-C can use to transmit in the current time interval, the ACs that the client STAs 104 A-C can use the RUs for in the current time interval, which client STAs 104 A-C will be wait-listed to a subsequent time interval, etc. The scheduling component 108 can employ one or more pre-configured (queuing) policies to allocate RUs to the client STAs 104 A-C.

As shown in FIG. 2, once the RU allocation is determined based on the BSRs 208, the AP 102 (via the scheduling component 108) transmits a trigger frame 204 to the client STAs 104 A-C. In one embodiment, the trigger frame 204 is a multi user (MU)-request to send (RTS) (MU-RTS) trigger frame that indicates to the client STAs 104 which RUs are assigned to the client STAs 104, the TXOP value that will be used, the preferred ACs that the client STAs should transmit from, etc. After transmitting the trigger frame 204, the client STAs respond with clear-to-send (CTS) frames 210 A-C. The CTS frames 210 prompt the AP 102 to transmit a trigger frame 206 indicating to the client STAs 104 that they can transmit their data frames 212 (e.g., uplink PPDUs), in accordance with their respective RU allocation information in the trigger frame 204. As noted, in some embodiments, the data frames 212 may be transmitted simultaneously, e.g., using OFDMA, MU-MIMO, etc. The AP 102 can then respond with a multi-STA block acknowledgement (ACK) 214 acknowledging the data frames 212.

Figure 4:
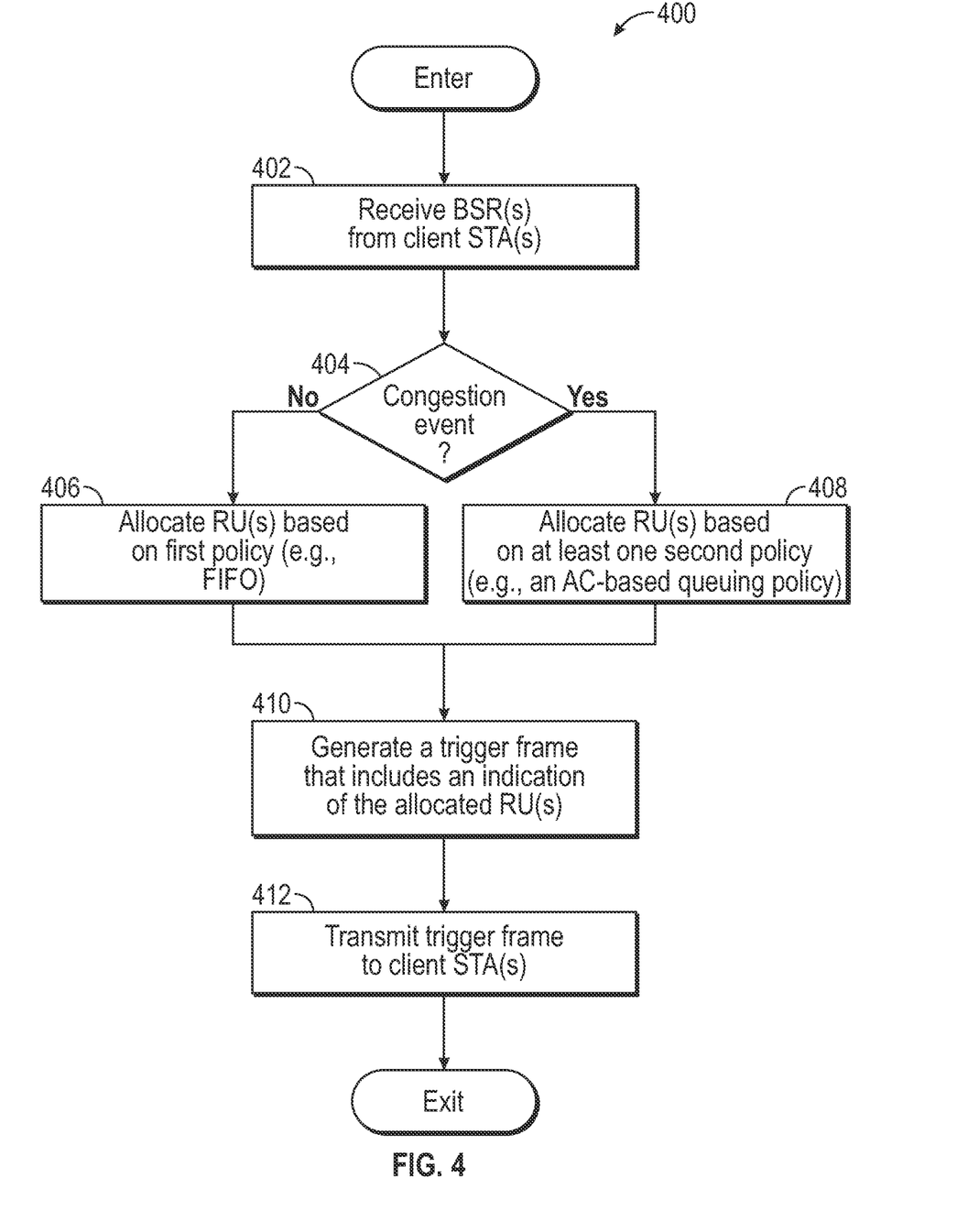
FIG. 4 is a flowchart of a method for managing congestion in a wireless network, according to one embodiment.

FIG. 4 is a flowchart of a method 400 for managing congestion in a wireless network (e.g., wireless network 100), according to one embodiment. The method 400 may be performed by a scheduling apparatus (e.g., AP 102).

Method 400 may enter at block 402, where the scheduling apparatus receives one or more BSRs (e.g., BSR 208) from one or more client STAs (e.g., client STAs 104). At block 404, the scheduling apparatus determines, based on the BSR(s), whether there is a congestion event. If a congestion event is not detected (block 404), then the scheduling apparatus allocates RU(s) to the client STAs based on a first policy (block 406). For example, the scheduling apparatus may refrain from invoking the scheduling apparatus and may proceed to allocate RU(s) and associated TXOPs to client STAs on a FIFO basis.

If a congestion event is detected (block 404), then the scheduling apparatus allocates RU(s) to the client STAs based on at least one second policy (block 408). For example, as described in more detail below, the second policy may be an AC-based queuing policy based on at least one of a current state of the AC queues at the client STA(s) and a priority of the AC queues. At block 410, the scheduling apparatus generates a trigger frame (e.g., trigger frame 204) that includes an indication of the allocated RU(s). At block 412, the scheduling apparatus transmits the trigger frame to the client STAs. As noted above with respect to FIG. 2, the trigger frame may prompt the client STAs to transmit CTS frames (e.g., CTS frames 210), which may prompt the scheduling apparatus to send another trigger frame (e.g., trigger frame 206), which indicates to the client STAs that they can send data frames to the scheduling apparatus. The method 400 may then exit.

Figure 5:
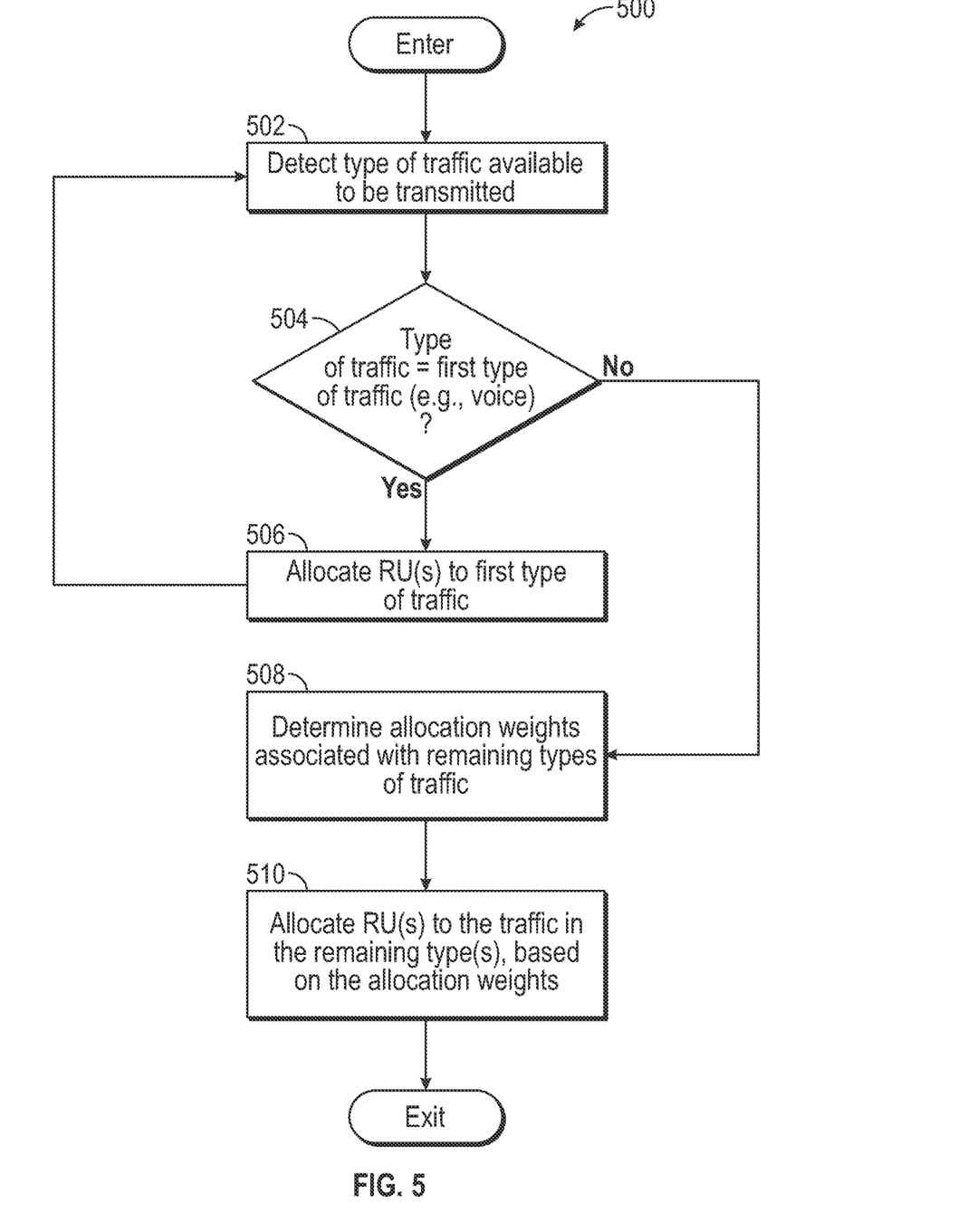
FIG. 5 is a flowchart of a method for allocating RUs based on an AC-based queuing policy, according to one embodiment.

FIG. 5 is a flowchart of a method 500 for allocating RUs based on an AC-based queuing policy, according to one embodiment. The method 500 may be performed by a scheduling apparatus (e.g., AP 102).

Method 500 may enter at block 502, where the scheduling apparatus detects a type of traffic available to be transmitted from at least one client STA (e.g., client STA 104), based on the BSR from the at least one client STA. For example, the BSR(s) may report that there is traffic present on a client STA(s) (and ready to be transmitted across the wireless channel). At block 504, the scheduling apparatus determines whether the type of traffic is a first type of traffic. For example, the first type of traffic may be traffic that belongs to a high priority AC (e.g., AC_VO).

In one embodiment, the scheduling apparatus may allocate RUs according to a first AC-based queuing policy for the first type of traffic. For example, if the scheduling apparatus determines that the type of traffic is the first type of traffic, the scheduling apparatus allocates RU(s) to the first type of traffic. For example, assuming the first type of traffic is voice, the scheduling apparatus can allocate an RU to each client STA that has voice traffic queued up and ready to transmit. In some embodiments, the scheduling apparatus can optimize the TXOP of the particular transmission cycle for the first type of traffic.

In some embodiments, the allocation in block 506 may involve allocating RU(s) on a first-come first serve basis. For example, in scenarios where there are more client STAs with voice packets to transmit than there are RUs for the channel, the scheduling apparatus may allocate RU(s) for the current time interval (TXOP) on a first-come first serve basis (e.g., based on the first BSRs that are processed by the scheduling apparatus). The scheduling apparatus may waitlist the remaining client STAs to the next transmission cycle, until the first type of traffic (e.g., voice) is fully serviced. That is, the scheduling apparatus may perform blocks 502, 504, and 506 until the first type of traffic is fully served with any available RUs.

Figure 6:
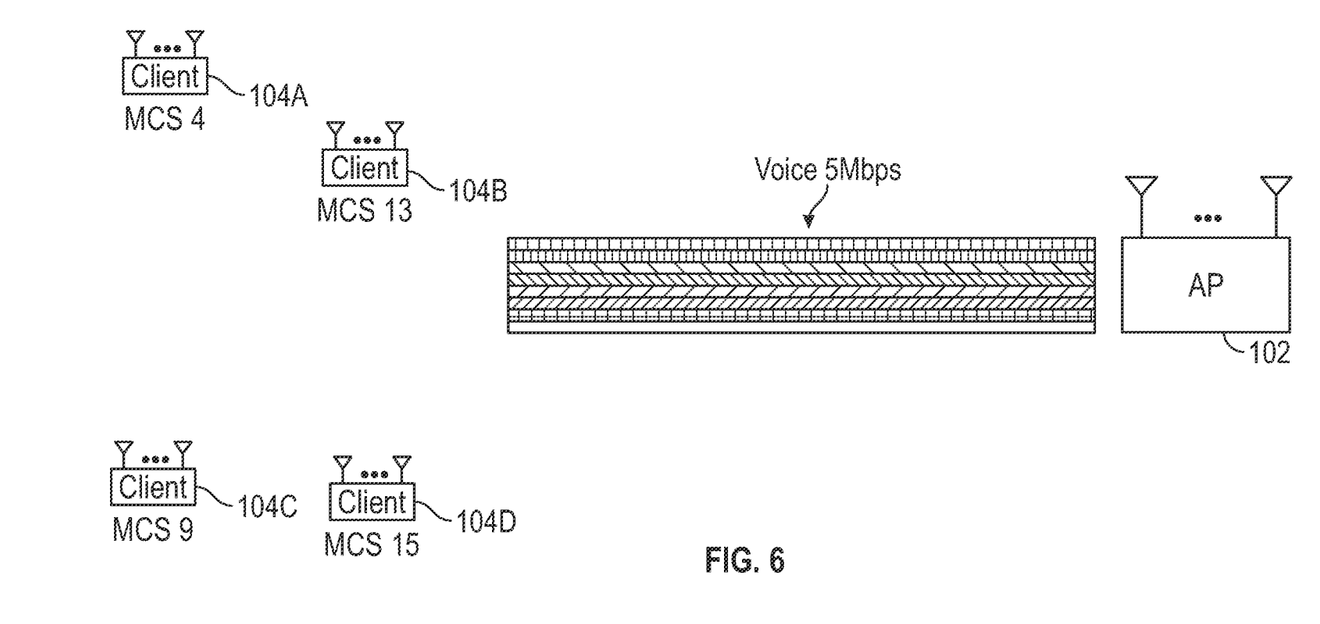
FIG. 6 illustrates an example of allocating RUs based on client STA criteria, according to one embodiment.

In some embodiments, the allocation in block 506 can involve modifying the allocation over time, based on one or more criteria. As shown in FIG. 6, for example, assuming a strict low-latency queuing (LLQ) policy assigned 5 Mbps to voice traffic, the AP 102 can use the MCS value of each client STA 104 signaling buffered voice traffic to assign RUs to each client STA 104. In one embodiment, allocating RU(s) based on the MCS allows the allocation to a given client STA to be maintained as the client STA moves within a cell (or even to an edge of the cell). In some embodiments, allocating RU(s) based on the MCS can be used to decline new voice flows when the current flow volume satisfies a predetermined condition (e.g., is within range of a pre-defined limit).

Referring back to FIG. 5, once the first type of traffic (e.g., voice) has been transmitted by the client STA(s), then the scheduling apparatus can service the remaining types of traffic (e.g., remaining ACs, such as video, best effort, and background). In one embodiment, the scheduling apparatus services the remaining types of traffic in accordance with a different AC-based queuing policy. For example, in one embodiment, the AC-based queuing policy can be based on a pre-configured set of weights. As shown in FIG. 5, for example, if at block 504, the scheduling apparatus determines that there is no first type of traffic remaining (e.g., type of traffic is not the first type of traffic), the scheduling apparatus determines allocation weights associated with the remaining types of traffic.

The allocation weights may be preconfigured by an operator and received from a controller (e.g., controller 120). For example, the controller may determine the allocation weights to apply to different AC traffic in accordance with an intent-based policy that is configured for multiple scheduling apparatuses. In some cases, the allocation weights can be specifically configured for the scheduling apparatus (by the controller) in order to bring the scheduling apparatus in line with the overall intent-based policy. For example, the controller may adjust settings of individual scheduling apparatuses to reflect the overall intent (e.g., adjusting individual scheduling apparatuses thresholds based on the number of scheduling apparatuses among which the policy is shared, the overall traffic mix observed across one or more of the scheduling apparatuses, etc.).

At block 510, the scheduling apparatus allocates RU(s) to the traffic in the remaining type(s), based on the allocation weights. In one reference example, assume a set of allocation weights are defined such that six of the remaining RUs would be allocated to video (e.g., AC_VI), two of remaining RUs would be allocated to best effort (e.g., AC_BE), and one of the remaining RUs would be allocated to background (e.g., AC_BK). In this example, if more than six client STAs had video traffic to send, then the client STAs with the largest video queues (e.g., based on their BSRs) would be serviced in the current transmission cycle, and the remaining client STAs would be waitlisted for the following transmission cycle. Additionally or alternatively, assuming no other traffic is present but video, then the TXOP for the transmission cycle can be optimized for video.

In one embodiment, the allocation in block 510 may continue, such that unused RUs are reallocated to any remaining types of traffic present, according to the respective allocation weights of each remaining type of traffic. For example, assume nine RUs were available, and no voice or video traffic was present. In this example, with the above allocation weights defined, six RUs would be allocated to best effort and three RUs would be allocated to background. That is, two RUs would be allocated to best effort traffic for every one RU allocated to background. The method 600 may then exit.

In this manner, embodiments enable a scheduling apparatus operating in a wireless network (e.g., 802.11 ax) to monitor an intent policy received from a controller (e.g., controller 120), determine an RU allocation map, based on the intent policy, and detect uplink congestion in the wireless network by monitoring uplink RU usage of client STAs and comparing it to the RU allocation map. When congestion is detected, the scheduling apparatus can structure a trigger frame that allocates RUs, based on an AC-based queuing policy. The AC-based queuing policy, for example, can favor client STAs with higher priority traffic in their transmit queues, which in turn can alleviate congestion with significantly impacting performance of the network.

Figure 7:
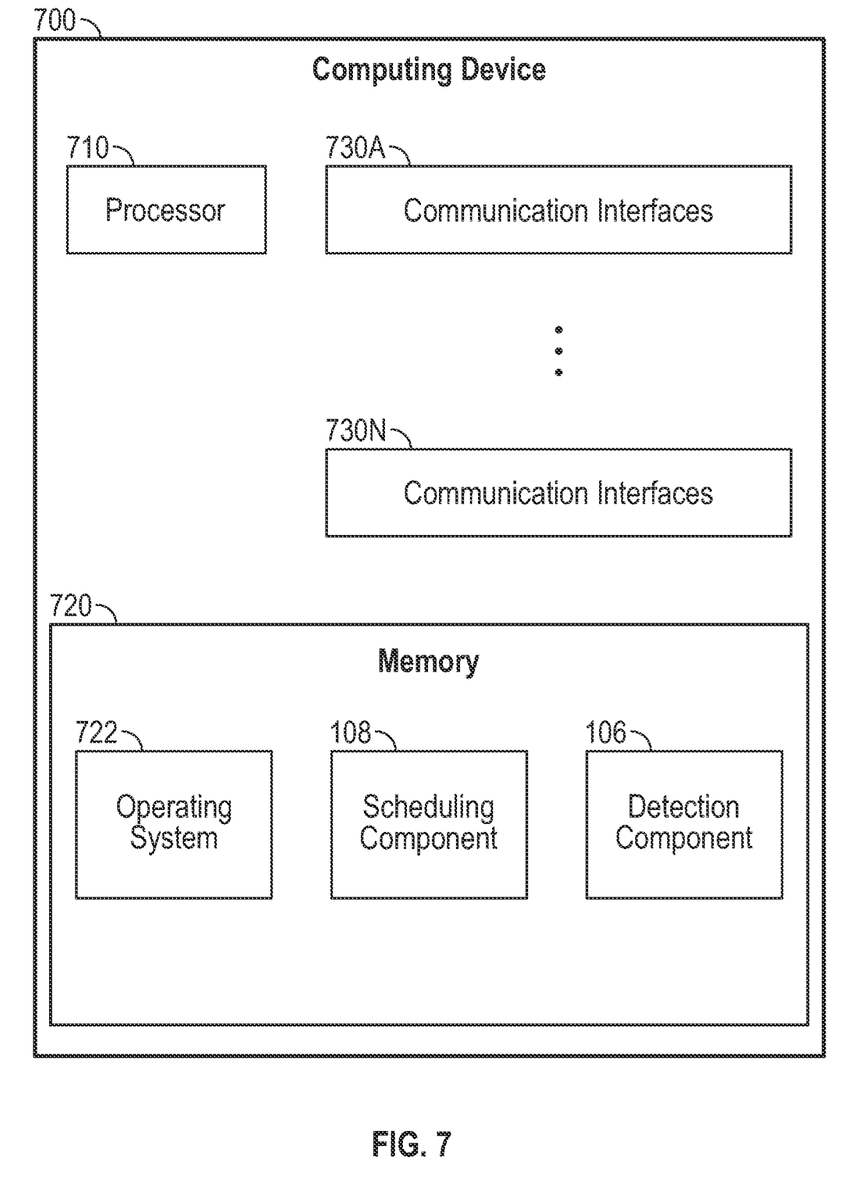
FIG. 7 illustrates an example computing device, according to one embodiment.

FIG. 7 illustrates an example computing device 700, according to one embodiment. The computing device 700 may be a scheduling apparatus that is configured to perform one or more techniques described herein for managing uplink congestion in a wireless network. The computing device 700 includes a processor 710, a memory 720, and one or more communication interfaces 730a-n (generally, communication interface 730). In various embodiments, the computing device 700 may represent an AP, wireless node, router, access node or any other computing device connected to or part of a wireless network 100.

The processor 710 may be any processing element capable of performing the functions described herein. The processor 710 represents a single processor, multiple processors, a processor with multiple cores, and combinations thereof. The communication interfaces 730 facilitate communications between the computing device 700 and other devices. The communications interfaces 730 are representative of wireless communications antennas and various wired communication ports. The memory 720 may be either volatile or non-volatile memory and may include RAM, flash, cache, disk drives, and other computer readable memory storage devices. Although shown as a single entity, the memory 720 may be divided into different memory storage elements such as RAM and one or more hard disk drives.

As shown, the memory 720 includes various instructions that are executable by the processor 710 to provide an operating system 722 to manage various functions of the computing device 700. As shown, the memory 720 includes an operating system 722, a detection component 106, and a scheduling component 108, described in more detail above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method performed by an apparatus, comprising:
   receiving, from one or more client stations, one or more buffer status reports (BSRs), each BSR from one of the client stations indicating at least (i) an amount of traffic in a transmit queue of the client station and (ii) at least one type of traffic associated with the amount of traffic in the transmit queue of the client station;
   upon determining, based on the one or more BSRs, that there is congestion on an uplink wireless channel shared by the one or more client stations, determining an allocation of resource units (RUs) for the one or more client stations, based on at least the at least one type of traffic in each transmit queue of the one or more client stations, wherein determining there is congestion on the uplink wireless channel comprises determining that a total amount of the at least one type of traffic is greater than an amount of RUs allocated to the at least one type of traffic;
   generating a first frame comprising (i) an indication of the allocation of the RUs for the one or more client stations and (ii) for each client station, an indication of a type of traffic in the transmit queue that is associated with the allocation of the RUs for the client station; and
   transmitting the first frame to the one or more client stations.

2. The computer-implemented method of claim 1, wherein determining there is congestion on the uplink wireless channel comprises determining that the amount of traffic in at least one transmit queue of at least one client station is greater than an available amount of RUs for the uplink wireless channel.

3. The computer-implemented method of claim 1, wherein determining the allocation of the RUs comprises:
   determining a first type of traffic present in at least one transmit queue;
   determining a second type of traffic present in at least another transmit queue, wherein the first type of traffic has a higher priority than the second type of traffic;
   allocating a set of the RUs to the first type of traffic; and
   refraining from allocating a set of the RUs to the second type of traffic, while the first type of traffic is present in any of the transmit queues.

4. The computer-implemented method of claim 3, wherein:
   determining the allocation of the RUs comprises determining that a number of client stations having the first type of traffic present in the respective transmit queues of the client stations is greater than an amount of RUs for the uplink wireless channel; and allocating the set of the RUs to the first type of traffic comprises:
- allocating a first RU to the first type of traffic present in a first transmit queue of a first client station for a first transmission cycle; and
- allocating a second RU to the first type of traffic present in a second transmit queue of a second client station for a second transmission cycle.

5. The computer-implemented method of claim 3, wherein determining the allocation of the RUs further comprises upon determining that the first type of traffic is not present in any of the transmit queues, allocating a set of the RUs to the second type of traffic.

6. The computer-implemented method of claim 5, wherein the allocation of the set of the RUs to the second type of traffic is based on a set of pre-defined weights associated with the second type of traffic.

7. The computer-implemented method of claim 3, wherein:
- the first type of traffic comprises voice traffic; and
- the second type of traffic comprises video traffic, best effort traffic, or background traffic.

8. The computer-implemented method of claim 1, wherein the allocation of the RUs is based on at least one modulation and coding scheme (MCS) associated with at least one of the client stations.

9. The computer-implemented method of claim 1, further comprising, after transmitting the first frame, transmitting a second frame triggering the one or more client stations to transmit uplink data using the allocation of the RUs indicated in the first frame.

10. The computer-implemented method of claim 1, further comprising transmitting a second frame to the one or more client stations to trigger transmission of the one or more buffer status reports.

11. An access point (AP), comprising:
- a processor; and
- a memory containing a program that, when executed by the processor, performs an operation comprising:
  - receiving, from one or more client stations, one or more buffer status reports (BSRs), each BSR from one of the client stations indicating at least (i) an amount of traffic in a transmit queue of the client station and (ii) at least one type of traffic associated with the amount of traffic in the transmit queue of the client station;
  - upon determining, based on the one or more BSRs, that there is congestion on an uplink wireless channel shared by the one or more client stations, determining an allocation of resource units (RUs) for the one or more client stations, based on at least the at least one type of traffic in each transmit queue of the one or more client stations, wherein determining there is congestion on the uplink wireless channel comprises determining that a total amount of the at least one type of traffic is greater than an amount of RUs allocated to the at least one type of traffic;
  - generating a first frame comprising (i) an indication of the allocation of the RUs for the one or more client stations and (ii) for each client station, an indication of a type of traffic in the transmit queue that is associated with the allocation of the RUs for the client station; and
  - transmitting the first frame to the one or more client stations.

12. The AP of claim 11, wherein determining there is congestion on the uplink wireless channel comprises determining that the amount of traffic in at least one transmit queue of at least one client station is greater than an available amount of RUs for the uplink wireless channel.

13. The AP of claim 11, wherein determining the allocation of RUs comprises:
- determining a first type of traffic present in at least one transmit queue;
- determining a second type of traffic present in at least another transmit queue, wherein the first type of traffic has a higher priority than the second type of traffic;
- allocating a set of the RUs to the first type of traffic; and
- refraining from allocating a set of the RUs to the second type of traffic, while the first type of traffic is present in any of the transmit queues.

14. The AP of claim 13, wherein:
- determining the allocation of RUs comprises determining that a number of client stations having the first type of traffic present in the respective transmit queues of the client stations is greater than an available amount of RUs for the uplink wireless channel; and
- allocating the set of the RUs to the first type of traffic comprises:
  - allocating a first RU to the first type of traffic present in a first transmit queue of a first client station for a first transmission cycle; and
  - allocating a second RU to the first type of traffic present in a second transmit queue of a second client station for a second transmission cycle.

15. A non-transitory computer readable storage medium having computer executable code stored thereon, the computer executable code being executable by one or more processors to perform an operation comprising:
- receiving, from one or more client stations, one or more buffer status reports (BSRs), each BSR from one of the client stations indicating (i) at least an amount of traffic in a transmit queue of the client station and (ii) at least one type of traffic associated with the amount of traffic in the transmit queue of the client station;
- upon determining, based on the one or more BSRs, that there is congestion on an uplink wireless channel shared by the one or more client stations, determining an allocation of resource units (RUs) for the one or more client stations, based on at least the at least one type of traffic in each transmit queue of the one or more client stations, wherein determining there is congestion on the uplink wireless channel comprises determining that a total amount of the at least one type of traffic is greater than an amount of RUs allocated to the at least one type of traffic;
- generating a first frame comprising (i) an indication of the allocation of the RUs for the one or more client stations and (ii) for each client station, an indication of a type of traffic in the transmit queue that is associated with the allocation of the RUs for the client station; and
- transmitting the first frame to the one or more client stations.

16. The non-transitory computer readable storage medium of claim 15, wherein determining there is congestion on the uplink wireless channel comprises determining that the amount of traffic in at least one transmit queue of at least one client station is greater than an available amount of RUs for the uplink wireless channel.

17. The non-transitory computer readable storage medium of claim 15, wherein determining the allocation of the RUs comprises:

determining a first type of traffic present in at least one transmit queue;

determining a second type of traffic present in at least another transmit queue, wherein the first type of traffic has a higher priority than the second type of traffic;

allocating a set of the RUs to the first type of traffic; and refraining from allocating a set of the RUs to the second type of traffic, while the first type of traffic is present in any of the transmit queues.

18. The non-transitory computer readable storage medium of claim 17, wherein:

determining the allocation of the RUs comprises determining that a number of client stations having the first type of traffic present in the respective transmit queues of the client stations is greater than an amount of RUs for the uplink wireless channel; and allocating the set of the RUs to the first type of traffic comprises:

allocating a first RU to the first type of traffic present in a first transmit queue of a first client station for a first transmission cycle; and allocating a second RU to the first type of traffic present in a second transmit queue of a second client station for a second transmission cycle.

19. The non-transitory computer readable storage medium of claim 17, wherein determining the allocation of the RUs further comprises upon determining that the first type of traffic is not present in any of the transmit queues, allocating a set of the RUs to the second type of traffic.

20. The non-transitory computer readable storage medium of claim 19, wherein the allocation of the set of the RUs to the second type of traffic is based on a set of pre-defined weights associated with the second type of traffic.

* * * * *